United States Patent Office 2,852,391
Patented Sept. 16, 1958

2,852,391

PROCESSES FOR IMPROVING THE FLAVOR OF MEATS

Beverly E. Williams, Hillsborough, Calif., assignor to Hodges Research and Development Company, New York, N. Y., a corporation of California No Drawing. Application April 29, 1957
Serial No. 655,547

3 Claims. (Cl. 99—107)

This invention relates to processes for improving the flavor of meats and more particularly to such processes in which enzymes cultured from the mold Thamnidium not before known as flavor enhancing agents are injected into meats immediately after slaughter while the tissues are still fluid and flaccid.

This application is a continuation-in-part of my application Serial No. 250,029, filed October 5, 1951, which is now abandoned.

Heretofore certain enzymes derived from the molds Aspergillus and the proteolytic enzymes have been proposed for use in tenderizing of meats. It has heretofore been proposed to either introduce these enzymes into the meat by pumping through the vascular system under pressure or by injecting into the meat after the meat has been chilled. Introduction of these enzymes through the vascular system is an objectional and expensive process so far as the meat industry is concerned because of the large volume of fluid required to fill the vascular system and the body organs of the carcass and because poor distribution of the enzymes is obtained with resultant spotty tenderizing. Improvement of flavor by such known processes appears to be negligible.

Injection of these known enzymes into the carcass after the carcass has been chilled and rigor mortis has occurred produces a very unsatisfactory tenderizing since once the meat and fat of the carcass are congealed distribution of the enzyme from the point of injection is limited resulting in over-tenderization in spots and none in others and no enhancement of flavor.

Further, some proteolytic enzymes have continuous action and this action must be arrested or stopped before the meat is spoiled by over-tenderization. Action of these enzymes is stopped by freezing or cooking. This is undesirable since precooked or frozen meat cannot be sold as fresh meat. Over-tenderization detracts from flavor.

I have found that the flavor of meats can be greatly enhanced without substantial improvement in tenderness by the use of enzymes cultured from the mold Thamnidium.

It is therefore an object of this invention to provide a method whereby the objectionable "bland" or "green" flavor of meat may be converted to an "aged" flavor without in any way detracting from other desirable qualities of the meat.

I have found that the appropriate time to inject the enzymes of Thamnidium into the carcass is immediately after slaughter while the tissues are still fluid and flaccid and before incipient rigor mortis. The amount of fluid containing the enzymes injected into the carcass is preferably proportional to the normal moisture loss during chilling of the meat being treated. It is known that carcass beef loses approximately 1% of its natural moisture during the first 24 hours in the cooler and another 1% during the next five to seven days. The quantity of fluid containing the enzyme should be equal to and not less than the amount of moisture lost by the beef during the first 24 hours of chilling and not greater in amount than the moisture lost by the beef during ordinary commercial practices. For treating a beef carcass by the present invention I prefer, therefore, to use fluid containing the enzyme weighing approximately 1 to 2% of the weight of the beef carcass. Thus the fluid containing the enzymes serves to replace the moisture lost by the beef during chilling and cold storage and the beef is not softened or unduly moistened by addition of an amount of fluid equivalent to the amount of moisture lost by the beef.

I prefer to introduce the enzyme in its fluid or aqueous carrier into the meat to be treated by the injection method. The fluid containing the enzyme is introduced into the carcass through a hollow needle which is introduced into the portions of the carcass to be treated at rather closely spaced intervals. For convenience this type of injection may be termed "stitch pumping."

A representative eviscerated carcass of beef may weight approximately 600 pounds and, when divided into halves, each side will weight approximately 300 pounds. Such a carcass will lose approximately 6 pounds of moisture initially or 3 pounds of moisture for each side. According to the present invention therefore a minimum of 3 pounds of the tendering fluid containing the enzyme is used for each side and a maximum of up to six pounds of the fluid may be employed. An average for such a side of beef is 4 pounds of the fluid containing the enzyme. As noted above this fluid is introduced by stitch pumping. The 4 pounds are distributed into the half carcass by injecting approximately a pound of the fluid into the round; another pound is pumped into the muscle of the loin; another pound is pumped into the rib; and the remaining pound is pumped into the chuck and distributed through the neck and front shank. This provides adequate distribution throughout the entire carcass and results in uniform flavor enhancement of the beef.

A similar procedure is followed for lambs and calves within the limits discussed above and if the carcasses are to be cooled with the hide on the injections must be made from the inner cavity to prevent punctures of the hide. Poultry and pork is also benefited by this process. After the meat has been treated in accordance with the process described above it is chilled in the normal way and handled by conventional practice. When the enzyme containing fluid is pumped into the meat as described above there will be no trace of the fluid since the warm, fluid, flaccid muscles before rigor mortis absorb and distribute the fluid without trace.

The enzymes cultured from the mold Thamnidium are active for approximately two weeks and then gradually terminate in activity and do not require freezing or cooking to prevent over-flavoring of the meat. Meat treated according to the present invention exhibits enhanced "aged" flavor after two or three days and the enhanced flavor increases up to about 13 days after slaughter.

I have further found that improved flavor is obtained if the fluid containing the enzyme of Thamnidium is introduced into the warm carcass on the killing floor at a temperature approximating 118° F. Carcasses of beef, lamb, veal, pork and other animals when first killed and dressed have a normal body temperature of approximately or above 98.6° F. If the fluid containing the enzyme is introduced into the meat at a temperature above 98.6° F. or normal animal body temperature and below a temperature which would cause searing or cooking of the meat, 120° to 125° F., the fluid will elevate the body temperature of the normally dressed meat and will improve the color and appearance of the meat as well as activate the natural enzymes thus causing an improved and accelerated aging and flavoring action. The additional heat introduced by the fluid containing the enzyme and heated to approximately 118° F. has the beneficial effect of keeping the carcass warm for an hour or more of treating time, providing better distribution throughout the carcass of the flavoring fluid. Any improvement in tenderness is probably occasioned by the action of the heated fluid under pressure and probably cannot be attributed to the action of the enzymes of Thamnidium.

Cultures containing the enzymes of Thamnidium may be prepared by seeding on agar to which is added a carbohydrate, for example, 1% sucrose. The organisms may be grown and will elaborate the desired proteases in standard types of media, such as bran broth, soy bean mash, potato dextrose, agar, etc. The enzyme then may be prepared in fluid form for injection or, preferably, may be dried under vacuum at low temperature and then ground into powder. This powder will then be added to distilled and preferably heated water just prior to injection to provide an injection medium having approximately 0.0002% to approximately 0.001% by weight of enzyme.

In this invention it is possible to use either the crude or purified proteinase and/or peptidase enzymes cultured by known laboratory means from the mold Thamnidium. The mold Thamnidium is quite different from Aspergillus as taught by Jensen, U. S. Patent 2,221,689, and is very little known commercially; its enzymes have never been used before in the treatment of meats. Like Aspergillus, the mold Thamnidium contains a great number of enzymes, but the two of paramount importance in the treatment of meats are proteinase and peptidase.

The class, order, family and genus of Thamnidium and Aspergillus are as follows:

Class:
    Ascomycetes        Phycomycetes
Order:
    Aspergillalaes      Mucorales
Family:
    Aspergillaceae     Mucoraceae
Genus:
    Aspergillus         Thamnidium The class of Ascomycetes has septate mycelium gametes and is always non-motile. Gamete neuclei do not fuse immediately after fusion of gametes. Gamete neuclei fuse in an ascus. Meiosis occurs in ascus. A definite number of spores is produced within the ascus. These spores are formed by free cell formation, as opposed to cleavage.

Thamnidum belongs to the class of Phycomycetes which class is characterized by mycelium being rarely septate. Sexual reproduction is by means of gametes that are either motile or non-motile. Gametes are always heterogomous or isogomous. After fusion of gametes, there is production of a resistant zygote or a diploid plant. There is production of either spores or conidia. The spores are formed by cleavage.

*Flavus oryzae* belongs to the *Fungi imperfecti*. This class is characterized by having no sexual reproduction, or at least no known sexual reproduction. Some of the members of this class are related to Ascomycetes but rarely to the Phycomycetes. Therefore, it will be seen from the following chart, which lists class, family and genus, that Aspergillus, Thamnidium and *Flavus oryzae* belong to separate classes, which is the highest magnitude of difference and still be Fungi.

| Ascomycetes | Phycomycetes | *Fungi imperfecti* |
|---|---|---|
| Aspergillaceae | Mucoraceae | Moniliaceae |
| Aspergillus | Thamnidium | Aspergillus |
| | | *Flavus oryzae* |

An original feature of this invention lies in the fact that the enzymes have been cultured and applied from the mold Thamnidium, which mold is not unnatural to meat and grows on meat and forms "whiskers" during the natural aging process, provided the conditions are right and conducive for the growth of this mold. Because this is the first time, at least for this purpose, that the enzymes have been derived from the mold Thamnidium, the entire enzyme system was not distinguished or classified, except for the two above mentioned enzymes, and they are, therefore, referred to as the end product or enzymes of the mold Thamnidium.

Although the mold Thamnidium is native to meat and grows on meat forming "whiskers" during the natural aging process of meat, it is often not present in amount sufficient to enhance the flavor of the meat. Three other molds are commonly found upon meat, namely, black spot mold, white mold, and blue-green mold. These last three molds are harmful to meat and deteriorate its appearance and condition. The mold Thamnidium, on the other hand, is helpful to meat because it increases flavor and gives meat the "walnut" flavor commonly associated with well aged meat.

The three harmful molds described above normally outgrow the mold Thamnidium to deteriorate the meat. When Thamnidium acts upon the meat by itself extremely favorable and unexpected flavor results are obtained. Such results are new and are not ordinarily obtained in usual aging practice because of contaminating conditions found in coolers and on the slaughtering floor.

When the enzymes derived from the mold Thamnidium are injected into the carcass immediately after killing, as described above, and when these enzymes are introduced in a heated aqueous fluid carrier to raise the temperature of the carcass, the enzymes of Thamnidium will be uniformly distributed throughout the carcass and will be provided with such favorable conditions for activity that the enzymes of Thamnidium will outgrow the harmful surface molds and will also combat bacteria deposited upon the meat from the air and from unsanitary handling conditions.

It will now be apparent to those skilled in the art that by the present invention I have provided novel processes for the enhancement of the flavor of meats which in every way provide the several advantages discussed above and further act to prevent growth of undesirable molds and combat the action of bacteria deposited upon the meat.

Changes in or modifications to the above described processes may now be suggested to those skilled in the art without departing from my inventive concept and reference should therefore be had to the appended claims to determine the scope of this invention.

What is claimed is:

1. In a process for enhancing the flavor of meats without tenderizing the meats by enzymatic action the step of injecting the freshly slaughtered carcass while warm and flaccid before rigor mortis with an injection medium heated to an approximate temperature in the approximate range of 98.6° F. to 118° F. having approximately 0.0002% to approximately 0.001% by weight of enzymes derived from the mold Thamnidium and thereafter cooling and storing the meat.

2. A process according to claim 1 in which the enzymes are dispersed in a fluid solution weighing from 1 to 2% of the weight of the carcass being treated.

3. In a process for enhancing the flavor of meats, the step of stitch pumping the carcass with an enzyme solution containing from approximately 0.0002% to 0.001% by weight of the enzyme at from approximately 98.6° F. to approximately 118° F. and weighing from approximately 1 to 2% by weight of the meat to be treated consisting of enzymes derived from the mold Thamnidium while the carcass is warm and flaccid and before rigor mortis and then cooling and storing the carcass for approximately two weeks.

References Cited in the file of this patent

UNITED STATES PATENTS

| | | |
|---|---|---|
| 2,043,392 | Paddock et al. | June 9, 1936 |
| 2,221,689 | Jensen | Nov. 12, 1940 |
| 2,240,518 | Ramsbottom | May 6, 1941 |
| 2,805,163 | Williams et al. | Sept. 3, 1957 |

OTHER REFERENCES

"Microbiology of Meats," second edition, 1945, by L. B. Jensen, published by The Garrard Press, Champaign, Illinois, pages 248 to 250, inclusive.